(12) United States Patent
Landvik

(10) Patent No.: US 6,602,579 B2
(45) Date of Patent: Aug. 5, 2003

(54) CUSHION

(75) Inventor: Dag Landvik, Saltsjo Boo (SE)

(73) Assignee: Tempur World, Inc., Lexington, KY (US)

( * ) Notice: Subject to any disclaimer, the term of this patent is extended or adjusted under 35 U.S.C. 154(b) by 181 days.

(21) Appl. No.: 09/758,018

(22) Filed: Jan. 10, 2001

(65) Prior Publication Data

US 2001/0021438 A1 Sep. 13, 2001

(30) Foreign Application Priority Data

Jan. 11, 2000 (DK) .......................... 200000027

(51) Int. Cl.⁷ .............................. B32B 3/12; A47C 20/02
(52) U.S. Cl. ..................... 428/158; 428/160; 428/166; 428/172; 428/215; 428/218; 428/309.9; 428/316.6; 5/655.9; 5/740
(58) Field of Search .................... 428/156, 158, 428/161, 163, 166, 172, 304.4, 316.4, 217, 218, 215, 316.6, 309.9; 5/654, 655.9, 731, 740

(56) References Cited

U.S. PATENT DOCUMENTS

| | | |
|---|---|---|
| 3,000,020 A | 9/1961 | Lombard et al. |
| 3,047,888 A | 11/1962 | Shecter et al. |
| 3,833,259 A | 9/1974 | Pershing |
| 3,906,137 A | 9/1975 | Bauer |
| 3,939,508 A | 2/1976 | Hall et al. |
| 4,086,675 A | 5/1978 | Talbert et al. |
| 4,190,697 A | 2/1980 | Ahrens |
| 4,379,856 A | 4/1983 | Samaritter et al. |
| 4,580,301 A | 4/1986 | Ludman et al. |
| 4,755,411 A | 7/1988 | Wing et al. |
| 4,808,469 A | 2/1989 | Hiles |
| 4,840,430 A | 6/1989 | Shimada |
| 4,843,662 A | 7/1989 | Handelman |
| 5,031,261 A | 7/1991 | Fenner, Sr. |
| 5,189,747 A | 3/1993 | Mundy et al. |
| 5,230,947 A | 7/1993 | Ou |
| 5,294,181 A | 3/1994 | Rose et al. |
| 5,522,106 A | 6/1996 | Harrison et al. |
| 5,855,415 A | 1/1999 | Lilley, Jr. |
| 6,115,861 A | 9/2000 | Reeder et al. |
| 6,159,574 A | 12/2000 | Landvik et al. |
| 6,202,239 B1 * | 3/2001 | Ward et al. ............... 5/727 |
| 6,237,173 B1 * | 5/2001 | Schlichter et al. ........... 5/722 |

FOREIGN PATENT DOCUMENTS

| | | |
|---|---|---|
| DE | 1654301 | 3/1971 |
| DE | 3321720 | 12/1984 |
| FR | 2598910 | 11/1987 |
| IT | 1238272 | 7/1993 |
| IT | 00224783 | 6/1996 |
| JP | 62-183790 | 8/1987 |
| JP | 3128006 | 5/1991 |

* cited by examiner

Primary Examiner—Donald J. Loney
(74) Attorney, Agent, or Firm—Michael Best & Friedrich LLP

(57) ABSTRACT

A cushion having an underlying polyurethane foam or flexible layer which includes a non-plane surface, and an overlying visco-elastic foam layer positioned adjacent to the non-plane surface of the underlying layer, the cushion being adapted for suitably supporting a load, such as a human body, positioned thereon.

18 Claims, 5 Drawing Sheets

CUSHION

BACKGROUND OF THE INVENTION

The present invention relates to a cushion such as a bed mattress, a seat cushioning, a back rest cushioning or any other cushion where a support and cushioning of the entire or a part of a human or animal body is desired. The cushion is of a type using visco-elastic plastic foam material for suitably distributing the pressure from the body over a relatively large surface area of the body being cushioned by the cushion, such as a person lying on a mattress, a person seated in a couch or an animal resting on a veterinary surgeon's table.

The visco-elastic foam assumes the form—in a somewhat "reluctant" manner—of the shape of the body, but when first it has been formed, it returns in a correspondingly "reluctant" manner to its original form when the pressure from the body is removed, so that a stable support of the body is maintained. A definition of a visco-elastic foam may be the following: A solid ball such as a steel ball that is dropped vertically downwards from a height of 1 m and by gravity lands on a plane surface of the visco-elastic foam has a rebound vertically upwards of less than 10%, i.e., a rebound of less than 10 cm upwards from the plane surface of the visco-elastic foam.

The formed foam thus exercises only a modest elastic counter-pressure against that surface by which it is loaded, and for precisely this reason it will therefore allow the body to sink relatively deeply into the cushion in such a manner that this distributes its overall counter-pressure over a large area of the body, with a relatively uniform and relatively low counter-pressure per unit area of the supported area of the body.

Cushions such as mattresses of this type are preferred by many users, but the cushions are, however, intended especially to alleviate or counteract sores such as bedsores (decubitus) obtained from high-pressure points when lying on a mattress among those who are confined to their beds for long periods of time.

For practical use, however, it will be a precondition that an ordinary elastic layer exists under the overlying visco-elastic layer in order to counteract the deepest depressed parts in the overlying layer in order to provide an increased counter-pressure as a consequence of being pressed against a firm layer such as the bunk of a bed, the seat or the backrest of a chair or a couch. It is hereby known that in order to achieve a reasonably limited cushion thickness, a layer is arranged in the form of a highly-elastic foam layer or a spring base with mechanical springs which provides a suitable gradient with respect to supporting of the user.

However, this support layer must also have an appreciable thickness so that the elastic counter-pressure can be distributed in a suitable manner over the area of the cushion, without this having any extra strong effect precisely at the deepest depressed parts. The result is that in order to maintain a reasonably modest cushion thickness, compromised solutions have had to be found both outwards and inwards of the cushion, in that the thickness of the underlying, highly elastic layer has been minimized to such a degree that the desire concerning a uniform distribution of the counter-elastic forces has not been able to be fully satisfied. With regard to the upper surface of the cushion, it has been recommended that the cushion be supplemented with an overlying cover element in the form of a thin "comfort-providing" plastic foam plate, which is easily elastic-compressible for final distribution of the counter-pressure on the body, but while still offering a degree of comfortable softness.

SUMMARY OF THE INVENTION

It is an object of the present invention to limit the poor pressure distribution of the highly elastic foam and to also avoid the lack of support that can be established by a cushion made of a material such as materials used for the overlying cover element. Thus, it is an object of the present invention to provide a high degree of support of the cushion irrespective of the weight distribution and of the entire weight of the person so that a more even pressure distribution is obtained of the cushion.

This object is obtained by a cushion where the cushion comprises an underlying layer consisting of a highly elastic polyurethane foam, at least a part of one side of the underlying layer being configured with at least one pattern of a non-plane surface, the mattress also comprising an overlying layer placed in abutment with the underlying layer, and said overlying layer being made of a visco-elastic foam.

With the present invention it has been found that it is possible to optimize a cushion of the relevant type, the cushion having, for example, a general thickness of between about 10 cm and 30 cm, preferably 15–20 cm, to offer a very high degree of pressure distribution without having points where the pressure is excessively higher than in other points. Accordingly, a high degree of user comfort of a lying person is offered.

According to the invention, this can be achieved by making use of a highly-elastic foam cushion plate, i.e., a plate element configured with a distinctly large non-plane upper surface. Certain users prefer to lie on such a surface, perhaps merely with separation with a sheet, i.e., resting against a number of coarsely distributed, conical-like or rib-like and substantially flexible raised portions.

By the present invention it has been realized that precisely such a surface on such a flexible plate element will constitute an ideal underlying layer for an overlying plate of the visco-elastic foam, in that such an underlying layer with a non-plane surface of any chosen shape will be able to display an ideal spring characteristic in supporting the overlying layer, which in itself will distribute and smooth out the direct counter-pressure from tops of the non-plane surface. The tops will thus not be effectual with regard to their original purpose, i.e., with regard to the "point supporting" of the body of the user, but rather on the contrary make it possible for the body of the user to be supported in a particularly uniform manner by use of the relevant underlying layer in relation to the visco-elastic overlying layer, and moreover without any of the layers needing to be particularly thick. A corresponding pressure distribution and comfort giving under support of the overlying layer cannot be achieved by use of a simple plate-shaped underlying part.

By the invention, a preferred feature is that the cushion is further configured with a relatively thin and soft top layer for integrated constitution of the overlying layer, so that the cushion can appear completely ready for use. This layer preferably also consists of visco-elastic foam material.

Other features and advantages of the invention will become apparent to those skilled in the art upon review of the following detailed description, claims and drawings in which like numerals are used to designate like features.

BRIEF DESCRIPTION OF THE DRAWINGS

In the following, the invention is explained in more detail with reference to the following drawings, where.

Figure 1:
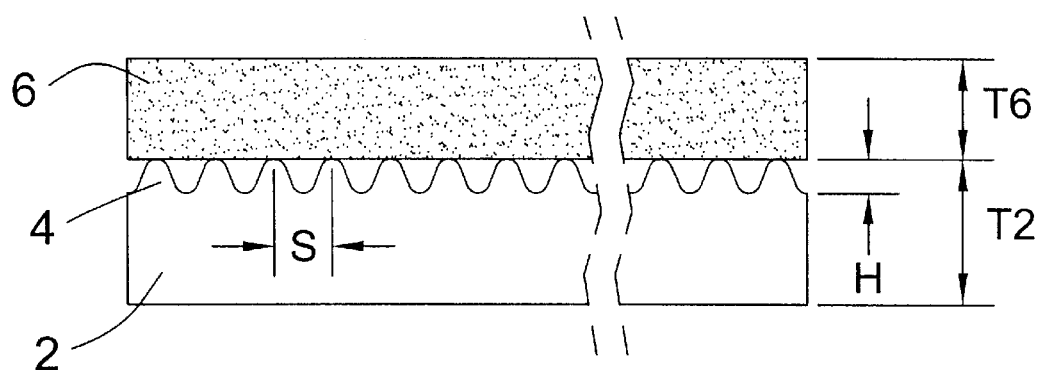
FIG. 1 shows a sectional view of a first embodiment of a cushion according to the invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting.

DETAILED DESCRIPTION OF THE INVENTION

Figure 2:
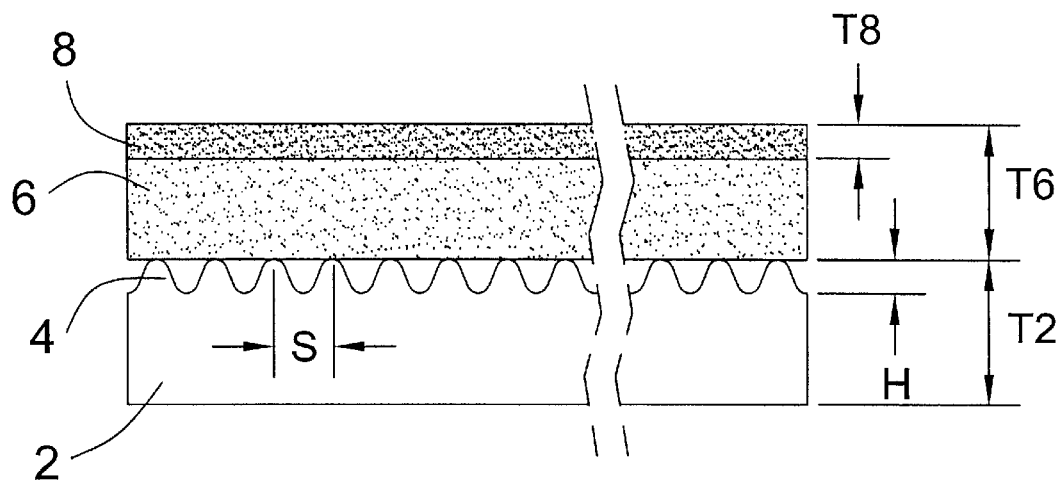
FIG. 2 shows a sectional view of a second embodiment of a cushion according to the invention.

The cushions shown in FIG. 1 and FIG. 2 are both illustrated with an underlying layer 2, which consists of a highly-elastic polyurethane foam configured with a non-plane surface pattern of upright cone-like bodies 4. Other patterns may be used such as ribs extending in any chosen direction or a combination of cone-like patterns and rib-like patterns. Still other surfaces may be bulges having an oval or a rectangular shape or bulges having any other separately designed and chosen shape.

The underlying layer 2 may have a thickness T2, which includes the height H of the cones 4, of e.g., 20–150 mm, preferably, 80–110 mm, wherein the cones may have a height H of e.g., 15–50 mm, preferably, 20–25 mm, and wherein the cones 4 may also have a mutual spacing S of e.g., 30–70 mm, preferably, 50 mm. The cones 4 can be formed by a known technique by which a plane splitting of a foam block is carried out with the opposing outer sides compressed in a corresponding pattern.

In the embodiments shown, only one side of the underlying layer 2 is construed with the truncated cones 4. Alternatively, it will be possible to have both sides of the underlying layer 2 construed with truncated cones 4. Also, the mutual spacings between the truncated cones 4 may vary so that the mutual spacings between the truncated cones 4 is different along one part of the underlying layer 2 as compared to other parts of the underlying layer 2. This may be especially advantageous if the cushion is to support bodies exerting different pressures at different locations on the cushion. Accordingly, there may be parts of the underlying layer 2 not having any truncated cones 4 at all and thus being plane. Finally, the height H of the truncated cones 4 may vary along the underlying layer 2 so that parts of the underlying layer 2 are construed with cones 4 with one height and other parts of the underlying layer 2 being construed with cones 4 of another height.

An overlying layer 6 having a thickness T6 of e.g., 20–100 mm, preferably, 70 mm, is placed above the underlying layer 2 with a lower surface of the overlying layer 6 resting on the tops of the cones 4. Preferably, the overlying layer 6 is fastened to the cone tops 4 by fusing, or gluing together or any other suitable mutual mechanical bonding between the overlying layer 6 and the cone tops 4, this overlying layer 6 being made of a visco-elastic foam material with suitable density and hardness, such as the material marketed under the name Tempur®. Thus, the overall thickness of the cushion can be about 40–300 mm.

As shown in FIG. 2, onto the overlying layer 6 a top layer 8 is placed, and preferably bonded to the overlying layer 6, said top layer 8 having a thickness T8 smaller than the thickness T6 of the overlying layer, e.g., with a thickness T8 of 5–30 mm, preferably 20 mm, and preferably, also being made of a visco-elastic material such as the material marketed under the name Tempur®, and more preferably made of a visco-elastic material being softer than the visco-elastic material which the overlying layer 6 is made of.

The terms underlying layer, overlying layer and top layer are meant as describing the position of the individual layers in relation to each other. Thus, the terms are not to be construed as the underlying layer being a layer, relative to an upward and downward orientation, lying beneath the overlying layer. It is meant as a layer lying on the farthest side of the cushion in relation to the body of the user. Similarly, the top layer, if a top layer is provided, is a layer lying on the nearest side of the cushion in relation to the body of the user. If the cushion, for example, is mounted on a back rest, then the underlying layer, the overlying layer and the top layer, if provided, will be orientated sideways and not downwards and upwards, respectively.

Also, the term body should not be construed as only the whole body of the user. The body may be any part of the body such as a head if the cushion is used as a pillow, the nates if the cushion is used as a seat or the back if the cushion is used as a back rest. However, the cushion may of course also support the whole body if the cushion is used as a mattress.

Furthermore, in the embodiments shown the overlying layer 6 is in abutment with the underlying layer 2 along a side of the underlying layer 2 being construed with the truncated cones 4, the truncated cones 4 thus being directed towards the overlying layer 6. Alternatively the overlying layer 6 could be in abutment with the side of the underlying layer 2 not being construed with the truncated cones 4, the truncated cones thus being directed away from the overlying layer 6 and towards a firm support such as the bottom of bed if the cushion is a mattress or the back rest of a chair if the cushion is used as a back rest.

The hardness of the highly elastic foam 2 should be about 100–2000 N, measured in accordance with ISO 2439, and the density should typically be about 30–40 kg/m$^3$. The visco-elastic layers, i.e., the overlying layer 6 and the top layer 8, have a density of around 50–100 kg/m$^3$, preferably 85 kg/m$^3$, and a hardness of around 60–100 N, preferably, a hardness of 70–85 N, with the top layer 8 being somewhat less than the overlying layer 6.

FIGS. 3–6 are graphic representations showing test results from a test made according to ISO 2439 (Method B) where a sample of foam material is subjected to a load from a circular piston. The circular piston has a plane end surface and the relation between the load from the piston and the corresponding strain is measured. The test involves three initial compressions to a strain of 70% of the initial height of the sample. The three initial compressions are intended for obtaining a representative sample, in which the sample has been subjected to a number of compressions before the actual tests are made. Thereby the sample is preloaded, which primarily has the effect that any crushing of a number of foam cells is established before the actual test is performed.

As can be seen in all of the graphic representations the first initial compressions are the highest lying of the curves. This is due to the fact that a number of foam cells are not yet crushed, which makes the foam "harder" and more "brittle", i.e., a higher load is necessary for obtaining a certain strain. The subsequent second and third initial compressions are the curves lying below the first mentioned curve. This is due to the fact that most of the number of foam cells have been crushed during the first initial compression and just a few foam cells are being crushed during the subsequent initial compressions.

Thus, the highest lying three curves are the three initial compressions when applying the load to the sample. When relieving the load, the relation between the load and the strain is illustrated by the lowest lying curves decreasing along a substantially vertical part of the curve from 70% strain at maximum load and flattening out to a substantially horizontal part of the curve towards 0% strain at a load of 0 N. The difference between the relation between load and strain when applying the load and when relieving the load is due to hysteresis in the foam material.

After the three initial compressions have been carried out, the sample is now mechanically stable and may now be subjected to the actual compression test. The actual test is the curve having the discontinuities where the load is decreasing at a certain strain. The discontinuity is due to the test procedure where a load is applied by pushing the piston first to a strain of 25% during which the strain is maintained for a period of 30 seconds. During the maintenance of the strain, the load necessary for maintaining the strain is decreasing which is illustrated as a decrease of the load in relation to the actual strain of 25%. The same procedure is used at a strain of 40% and at a strain of 65%. The reason for the load decreasing is the actual elastic behavior of the foam, where both the highly elastic and the visco-elastic foam exhibit a viscous behavior. In the following, the four samples will be described in the table below and the actual compression test, not the initial compressions, will be discussed.

Figure 3:
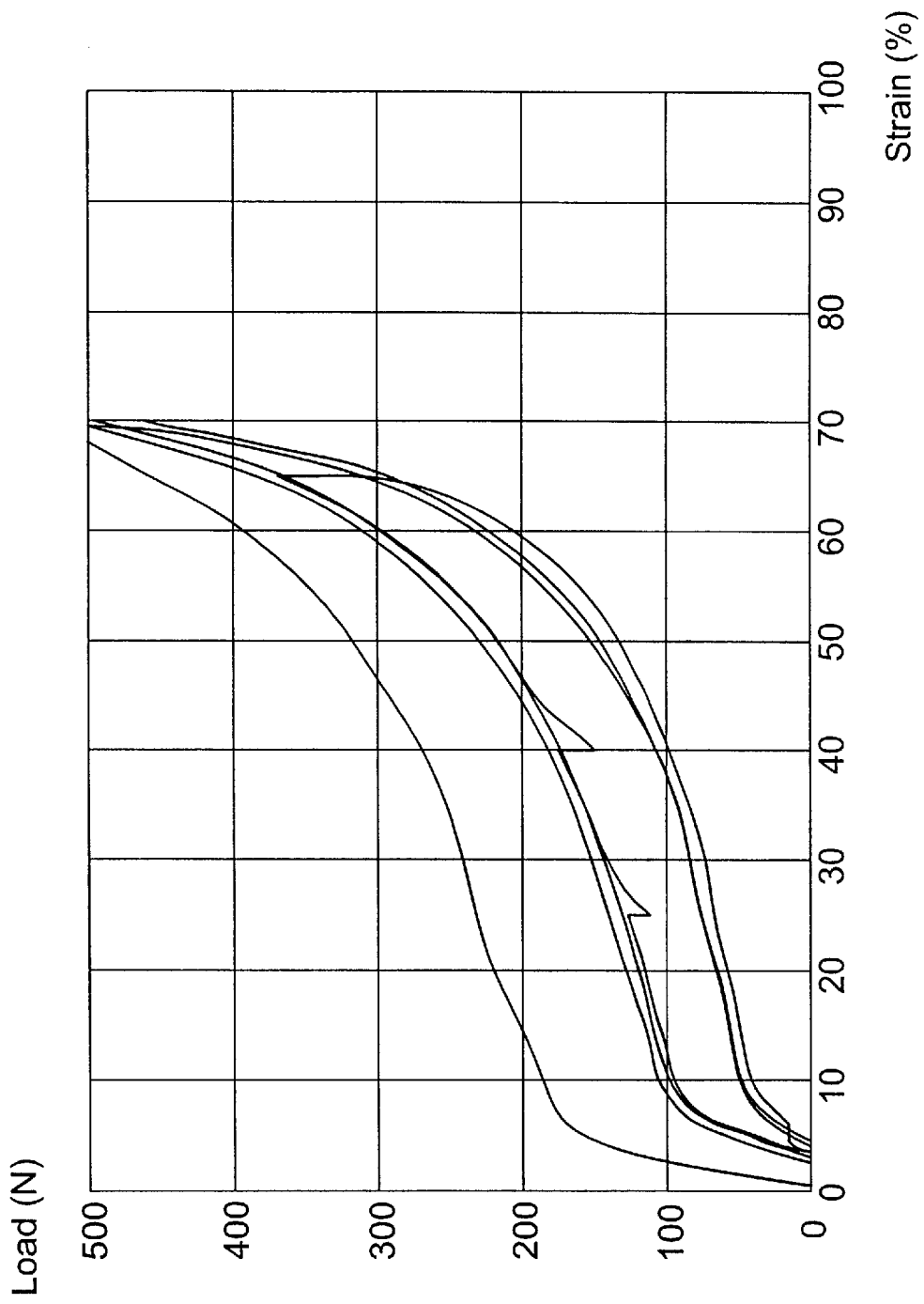
FIG. 3 is a graphical representation showing a test of the load needed for achieving a certain strain of highly elastic polyurethane foam.

| Batch reference & Sample reference | Initial height (mm) | 25% strain (N) | 40% strain (N) | 65% strain (N) |
|---|---|---|---|---|
| FIG. 3: HE35N Mattress with plane surface | 50.8 | 112.4 | 152.3 | 308.5 |
| FIG. 4: T85-13 Mattress with plane surface | 50.6 | 58.0 | 76.6 | 141.2 |
| FIG. 5: HE35N + T85-13 Mattress with plane interface | 151.0 | 102.7 | 177.3 | 374.3 |
| FIG. 6: HE35N + 85-13 Mattress with non-plane interface | 146.0 | 77.2 | 132.6 | 290.2 |

FIG. 3 shows the relation between load and strain for commonly known highly elastic foam. Initially, the load applied is high in relation to the strain obtained. At a strain of about 8% the relation between the load and the strain decreases. At a strain of about 50% the relation between the load and the strain increases. Accordingly, there is a very uneven relation between the load and the strain during compression up to 65% strain, however the load carried being very high in relation to the strain caused by the load.

Figure 4:
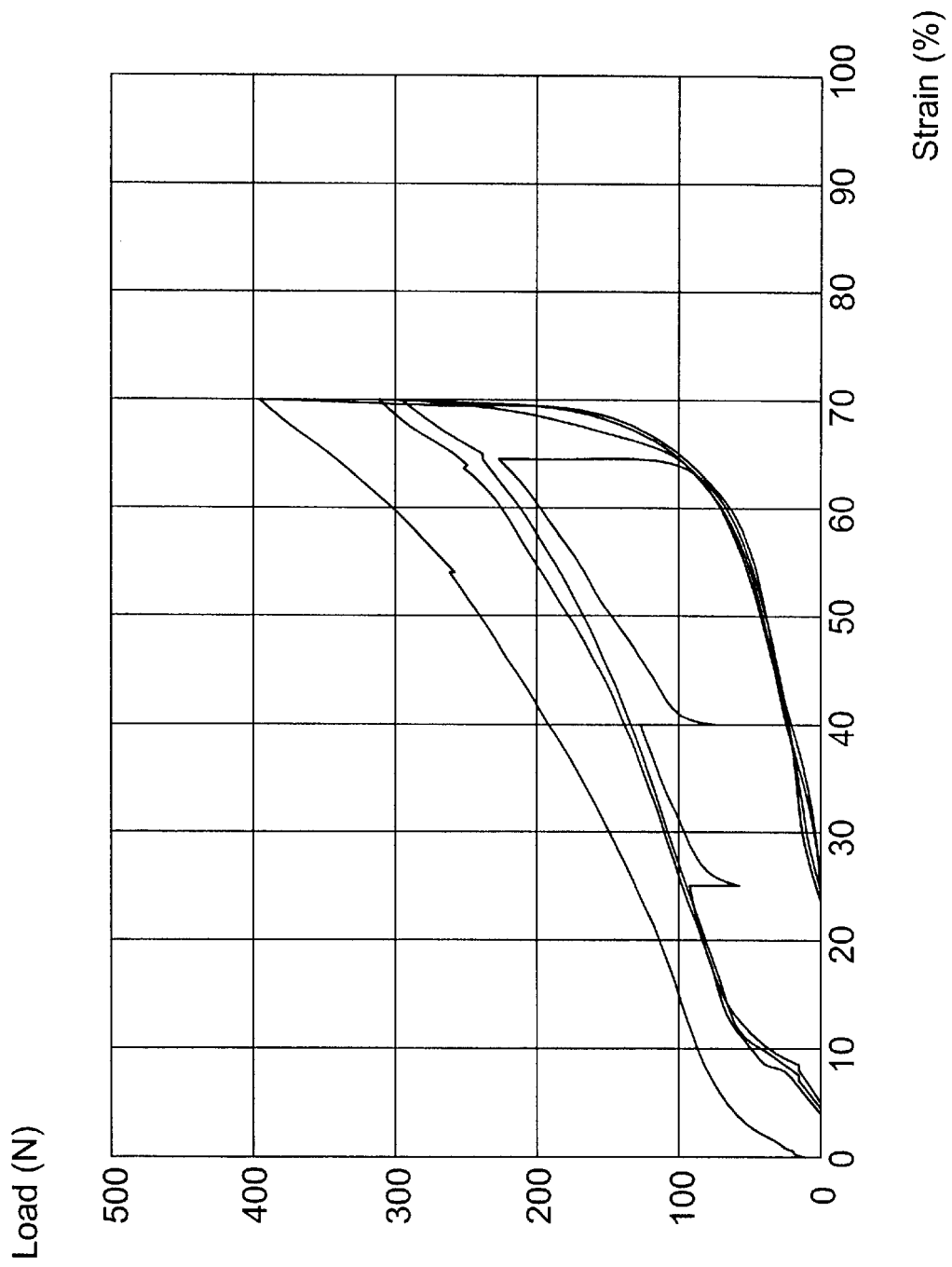
FIG. 4 is a graphical representation showing a test of the load needed for achieving a certain strain of visco-elastic foam.

FIG. 4 shows the relation between load and strain for known visco-elastic foam. Initially, the load applied is high, but limited, in relation to the strain obtained. At a strain of about 8% the relation between the load and the strain decreases. The relation between the strain and the load is substantially the same up to the strain of 65%. Accordingly, there is a much more even relation between the load and the strain during compression up to 65% strain, however the load carried being very limited in relation to the strain caused by the load.

Figure 5:
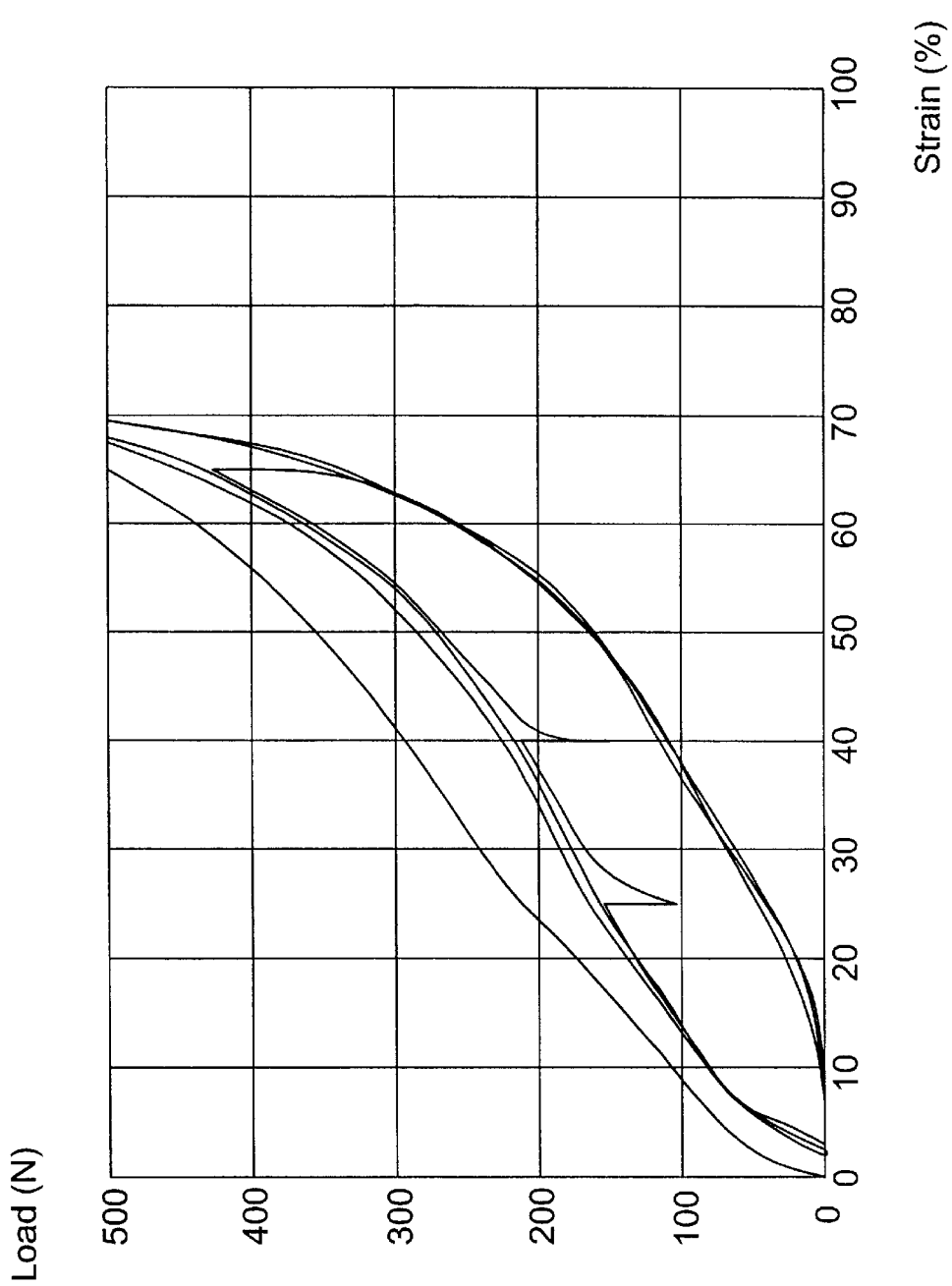
FIG. 5 is a graphical representation showing a test of the load needed for achieving a certain strain of a combination of highly elastic polyurethane foam and visco-elastic foam.

FIG. 5 shows the relation between load and strain for a combination of common highly elastic foam and a known visco-elastic foam, where the interface between the foams is established between a plane upper surface of the highly elastic foam and a planer lower surface of the visco-elastic foam. The total thickness of the mattress is 151.0 mm, where the thickness of the highly elastic foam is about 80 mm and the thickness of the visco-elastic foam is about 70 mm. The difference between the individual thicknesses and the total thickness is established during the mutual bonding of the two layers of foam, where fusing together the two layers may cause the interface to create the difference.

Initially, the load applied is high, but somewhat limited, in relation to the strain obtained. At a strain of about 4% the relation between the load and the strain decreases. At a strain of about 50% the relation between the load and the strain increases. Accordingly, there is still a somewhat uneven relation between the strain and the load during a compression up to 65% strain, however the load carried being relatively high due to the highly elastic foam and the relation being somewhat more even due to the visco-elastic foam.

Figure 6:
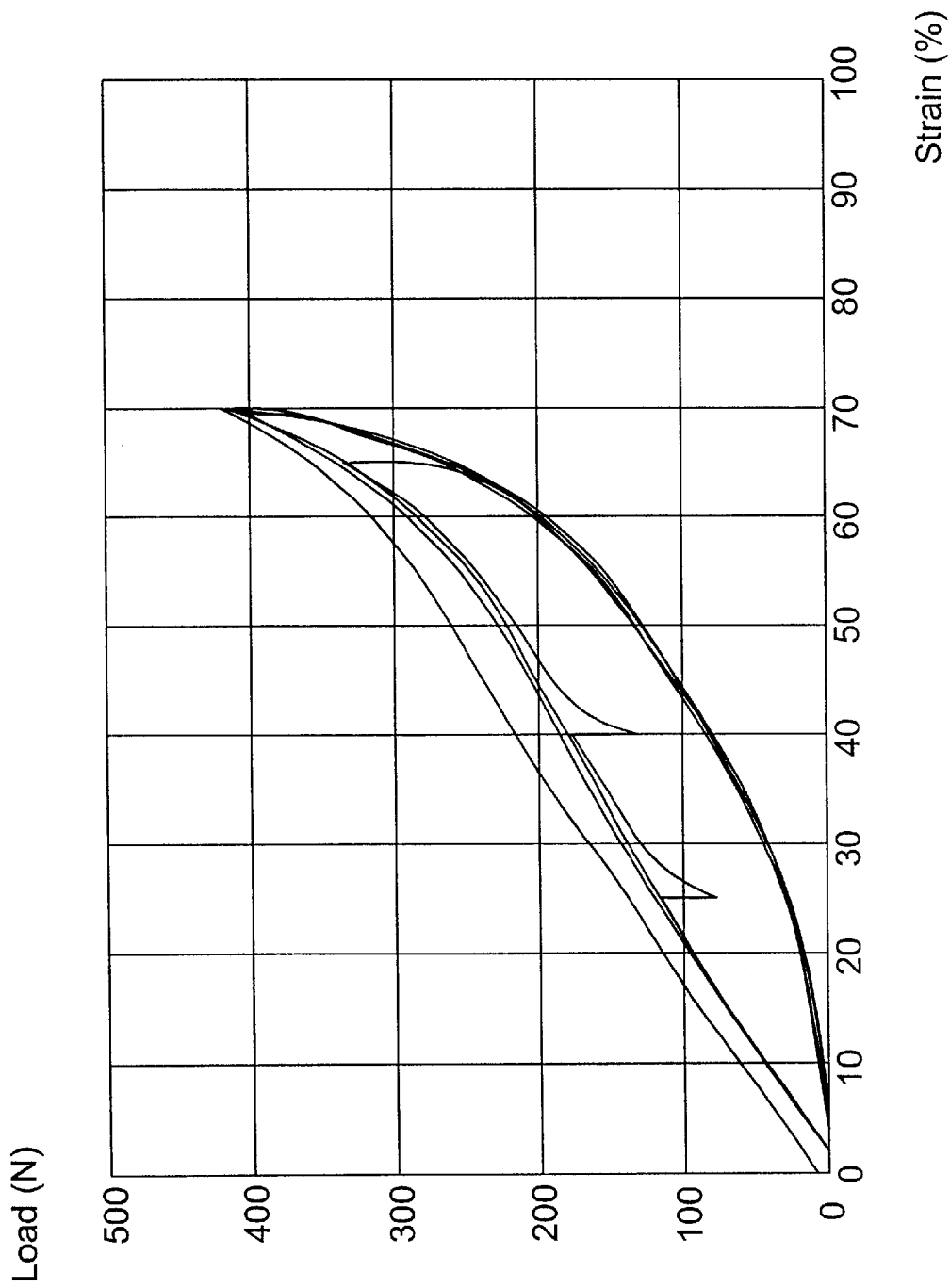
FIG. 6 is a graphical representation showing a test of the load needed for achieving a certain strain of a combination of highly elastic polyurethane foam with a non-plane surface and visco-elastic foam.

FIG. 6 shows the relation between load and strain for a combination of highly elastic foam having a non-plane surface and a known visco-elastic foam, where the interface between the foams thus is non-plane. The surface of the highly elastic foam is provided with a cone-like surface. The total thickness of the mattress is 146.0 mm, where the thickness of the highly elastic foam still is about 80 mm and the thickness of the visco-elastic foam still is about 70 mm. The difference between the individual thickness and the total thickness is established during the mutual bonding of the two layers of foam, where tops of the cone-like surface are partly disintegrated when fusing the two layers together.

Both initially and during substantially the entire application of load the relation between the load and the strain is substantially linear. The relation between the load and the strain increases very little until after a strain of above 50% is obtained. Accordingly, there is a substantially linear relation between the load and the strain during the entire compression up to 65% strain due to the non-plane surface of the highly elastic surface and the consequently new interface between the highly elastic foam and the visco-elastic foam. Also, the load carried is relatively high due to the highly elastic foam and, as mentioned, the relation between the load and the strain is completely even due to the new combination of the non-plane surface of the highly elastic foam and the visco-elastic foam.

The invention has been described with reference to tests made to specific samples of highly elastic foam and of visco-elastic foam and two combinations of these. However, both the type of highly elastic foam and the type of visco-elastic foam, the dimensions of the foams and the combinations of the foams may be different, without departing from the scope of protection, where the highly elastic foam has an uneven surface, which preferably is the surface bonded to a surface of a visco-elastic foam. Only by combining the highly elastic foam having an uneven surface with the visco-elastic foam is it possible to obtain results as the ones shown in FIG. 6, i.e., a substantially linear relation between the load and the strain resulting in a substantial increase in user comfort for the user lying, sitting or resting against the cushion, but still maintaining a satisfactory high load carrying capacity.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A support cushion comprising an underlying layer consisting of a flexible foam, at least one side of the underlying layer being configured with a continuous pattern of a non-plane surface construed of truncated cones, the cushion also comprising an overlying layer placed in abutment with the side of the underlying layer having the non-plane surface, and said overlying layer being made of a visco-elastic foam.

2. A cushion according to claim 1, wherein the overlying layer is joined together with the underlying layer by fusing a side of the overlying layer with the side of the underlying layer having the non-plane surface.

3. A cushion according to claim 1, wherein the overlying layer is joined together with the underlying layer by gluing a side of the overlying layer to the side of the underlying layer having the non-plane surface.

4. A cushion according to claim 1, wherein the truncated cones configured in the underlying layer have a height of between about 15 mm and 30 mm.

5. A cushion according to claim 1, wherein the truncated cones configured in the underlying layer have tops, such that there exists a mutual spacing between the tops of the truncated cones of between about 30 mm and 70 mm.

6. A cushion according to claim 1, further comprising a top layer placed adjacent to the overlying layer, wherein the top layer is made of a visco-elastic foam.

7. A cushion according to claim 6, wherein the top layer has a thickness of between about 5 mm and 25 mm.

8. A cushion according to claim 1, further comprising a top layer placed adjacent to the overlying layer, such that the cushion has an overall thickness of between about 40 mm and 300 mm.

9. A cushion according to claim 1, further comprising a top layer placed adjacent to the overlying layer, such that the cushion has a total thickness of between about 100 mm and 260 mm.

10. A cushion according to claim 1, further comprising a top layer placed adjacent to the overlying layer, such that the cushion has a total thickness of between about 130 mm and 240 mm.

11. A cushion according to claim 1, further comprising a top layer placed adjacent to the overlying layer, such that the cushion has a total thickness of between about 130 mm and 220 mm.

12. A cushion according to claim 1, further comprising a top layer placed adjacent to the overlying layer, such that the cushion has a total thickness of between about 150 mm and 200 mm.

13. A cushion according to claim 6, wherein the overlying layer and the top layer have substantially equal densities.

14. A cushion according to claim 13, wherein the density of each of the top layer and the overlying layer is between about 50 kg/m$^3$ and 100 kg/m$^3$.

15. A cushion according to claim 13, wherein the density of each of the top layer and the overlying layer is between about 80 kg/m$^3$ and 90 kg/m$^3$.

16. A cushion according to claim 6, wherein the overlying layer has a higher hardness than the top layer.

17. A cushion according to claim 16, wherein the overlying layer has a hardness of between about 60 N and 100 N.

18. A cushion according to claim 1, wherein the underlying layer is made of a highly elastic polyurethane foam material.

* * * * *